United States Patent [19]

Koyama et al.

[11] Patent Number: 5,689,172
[45] Date of Patent: Nov. 18, 1997

[54] CHARGING BATTERY SYSTEM FOR VIDEO CAMERA

[75] Inventors: Toshio Koyama, Kanagawa; Hiroyuki Arakawa, Tochigi, both of Japan

[73] Assignee: Sony Corporation, Japan

[21] Appl. No.: 709,324

[22] Filed: Sep. 4, 1996

Related U.S. Application Data

[63] Continuation of Ser. No. 115,715, Sep. 3, 1993, abandoned.

[30] Foreign Application Priority Data

Sep. 18, 1992 [JP] Japan ................................ 4-250108
Mar. 31, 1993 [JP] Japan ................................ 5-094991

[51] Int. Cl.$^6$ .......................... H02J 7/04; H02M 10/44
[52] U.S. Cl. ............................................ 320/15; 320/39
[58] Field of Search ........................ 320/2, 8, 6, 9, 320/15, 39

[56] References Cited

U.S. PATENT DOCUMENTS

| | | | |
|---|---|---|---|
| 4,449,089 | 5/1984 | Winkler | 320/15 |
| 4,920,307 | 4/1990 | Iketani | 320/28 |
| 5,028,859 | 7/1991 | Johnson et al. | 320/15 |
| 5,162,719 | 11/1992 | Tomura et al. | 320/2 |
| 5,254,931 | 10/1993 | Martensson | 320/22 |
| 5,287,053 | 2/1994 | Hutchinson | 320/2 |

FOREIGN PATENT DOCUMENTS 2634569  1/1990  France .
2242794  10/1991  United Kingdom .

OTHER PUBLICATIONS

EPO Search Report Patent Abstracts of Japan, JP4279876, May 10, 1992.

*Primary Examiner*—Peter S. Wong
*Assistant Examiner*—Gregory Toatley
*Attorney, Agent, or Firm*—Ronald P. Kananen

[57] ABSTRACT

An electronic equipment having a rechargeable battery in combination with a power source adapter. A rechargeable battery is detachably mounted in the electronic equipment. The power source adapter is adapted for supplying power to the electronic equipment from outside, and includes a first battery loading unit for loading a rechargeable battery, a charging voltage generating unit for generating a charging voltage for charging both the loaded rechargeable battery and the rechargeable battery mounted in the electronic equipment, a switching unit for switching between supplying the charging voltage to the charging unit and supplying the charging voltage to the electronic equipment, a detection unit for detecting completion of charging of the rechargeable battery loaded on the power source adapter, and a switching control unit for controlling the switching of the switching unit responsive to the output of the detection unit.

9 Claims, 9 Drawing Sheets

QUICK CHARGING

CHARGING BATTERY SYSTEM FOR VIDEO CAMERA

This application is a continuation of application Ser. No. 08/115,715 filed Sep. 3, 1993, now abandoned.

BACKGROUND OF THE INVENTION

This invention relates to a charging system for a video camera employed for supplying an electrical power source to the video camera.

Heretofore, the battery, which has been used as a power supply source for a video camera in addition to an external power source, is designed to be detachable, and is mounted on the outer side of a main body of the video camera. Besides, since the battery is charged by a dedicated charging device, the battery has to be detached detached from the main body of the video camera and mounted on the dedicated charging device.

Meanwhile, it is an inconvenient operation to detach the battery from the video camera each time it must be charged and to mount it on the charging device. It is therefore desirable to connect the battery to the charging device for charging while the battery is enclosed within the main body of the video camera. It is however time-consuming to charge the battery as it is enclosed within the main body of the video camera.

It may now be contemplated that, if the charging of a battery by the dedicated charging device and the charging of the battery enclosed within the main body of the video camera should be effected in one and the same system, the charging may be achieved in which the shortcomings of the firstly mentioned charging and the secondly mentioned charging cancel each other. However, there lacks up to now such charging system for the video camera.

OBJECTS AND SUMMARY OF THE INVENTION

It is an object of the present invention to provided a novel charging system for a video camera.

It is another object of the present invention to provide a charging system for a video camera in which a battery mounted on a power supply adapter may be charged before the charging of another battery enclosed within the main body of the video camera so that whichever battery is ready for use may be obtained promptly.

The present invention provides an electronic equipment having a rechargeable battery in combination with a power source adapter. The rechargeable battery is detachably mounted in the electronic equipment for being driven by the rechargeable battery as an internal power source. A power source adapter is adapted for supplying power to the electronic equipment from outside, and includes a first battery loading unit for loading a first rechargeable battery, a charging voltage generating unit for generating a charging voltage for charging the first rechargeable battery and a second rechargeable battery loaded on the electronic equipment, a first charging unit for charging the first rechargeable battery loaded on the first battery loading unit using the charging voltage, a switching unit for switching between supplying the charging voltage to the first charging unit and supplying the charging voltage to the electronic equipment, a detection unit for detecting completion of charging of the first rechargeable battery, and a switching control unit for controlling the switching of the switching unit responsive to an output of the detection unit. The electronic equipment includes a second loading unit for loading the second rechargeable battery as internal drive for driving the electronic equipment, and a second charging unit for receiving the charging voltage from the power source adapter for charging the second rechargeable battery. Since the first rechargeable battery is externally mounted on the power source adapter, and is charged more promptly than the second rechargeable battery loaded within the main body of the video camera, the first rechargeable battery may be exchanged for the second rechargeable battery for setting the video camera into operation without the necessity of waiting for the end of charging of the second rechargeable battery loaded on the main body.

That is, with the charging system for the video camera according to the present invention, the external power source is supplied by the power source adapter to the main body of the video camera, while charging the second rechargeable battery. The power source having the first rechargeable battery mounted therein is connected to the main body of the video camera having the second rechargeable battery enclosed therein. When charging the first and second rechargeable batteries, the charging of the second rechargeable battery is started after the end of charging of the first rechargeable battery, so that the quickly charged first rechargeable battery may be exchanged for the second rechargeable battery for setting the video camera into operation without the necessity of waiting for the end of charging of the second rechargeable battery loaded on the main body. If sufficient time is available, there is no necessity of detaching the second rechargeable battery enclosed within the main body of the video camera so that the video camera may be driven at all times by the second battery which is then in a charged state.

Other objects and advantages of the present invention will become more apparent from the following description of the preferred embodiments and the claims.

BRIEF DESCRIPTION OF THE INVENTION

DETAILED DESCRIPTION OF THE INVENTION

Figure 1:
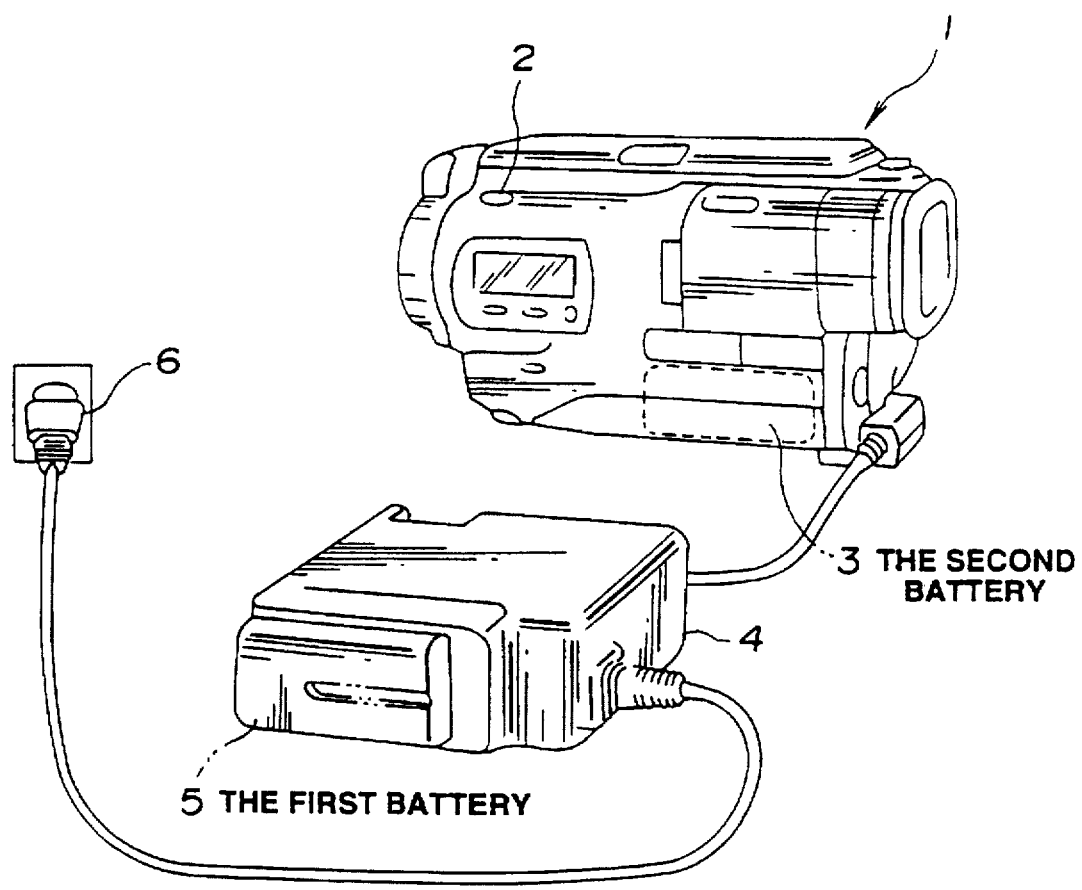
FIG. 1 is a schematic perspective view showing an arrangement of a charging system for a video camera according to the present invention.

Referring to the drawings, an embodiment of the present invention in which the video camera charging system according to the present invention is applied to an camera-integrated type video camera device is explained in detail.

Figure 2:
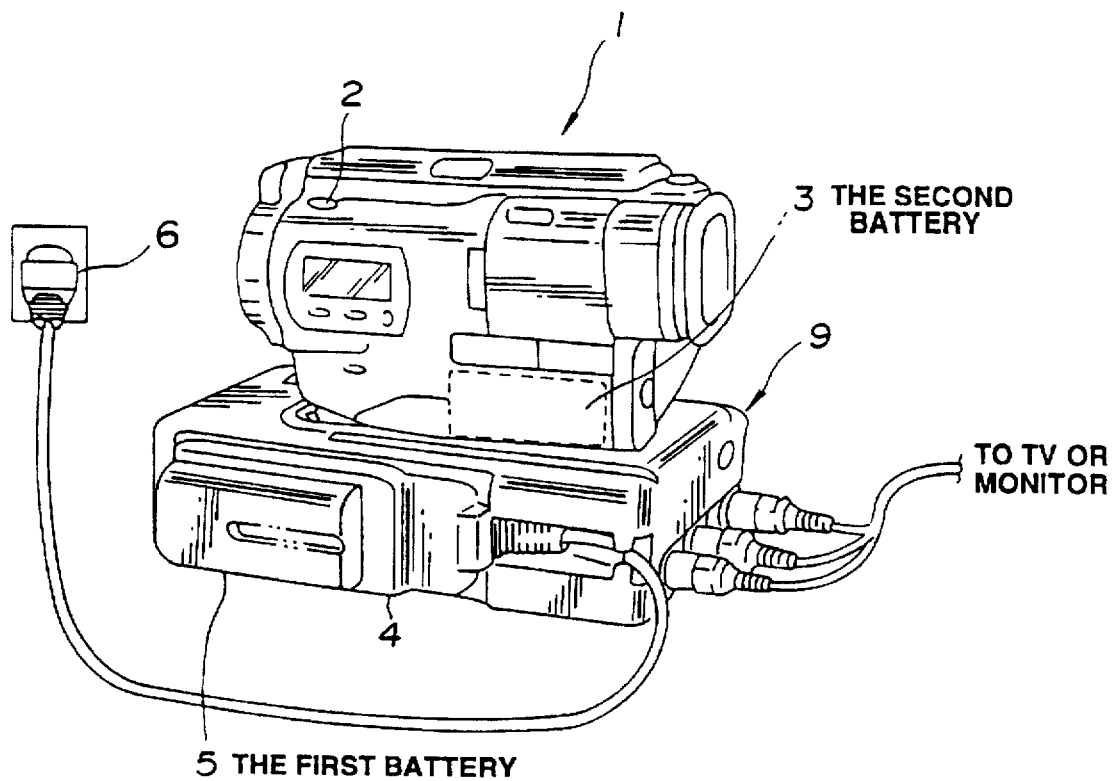
FIG. 2 is a schematic perspective view showing an arrangement of the charging system for the video camera according to the present invention, shown with the use of a station.

FIGS. 1 and 2 illustrate a schematic construction of the present embodiment.

The present embodiment is directed to a charging system for charging a battery which is enclosed within a main body of a video camera 1 which is provided with a power switch 2 for supplying a power. The charging system includes a power supply adapter 4 having the function not only of supplying an external power to the main body of the video camera 1 but also of charging the battery, refereed to hereinafter as an AC adapter.

FIG. 1 shows the main body of the video camera 1 and the AC adapter 4 connected to each other by means of a dedicated connecting cord and FIG. 2 shows the main body of the video camera 1 loaded on a station 9, which is a dedicated mounting device, and to which the AC adapted 4 is connected by insertion. In both of these figures, a power source is shown to be connected to the Ac adapter 4 via an AC power source connector.

In FIGS. 1 and 2, the AC adapted 4 is adapted for charging a first rechargeable battery 5 associated with the AC adapter 4 itself and a second rechargeable battery 3 associated with the main body of the video camera 1. The first rechargeable battery is mounted by a first battery loading unit having e.g. a pawl-groove type engaging means for attaching the loading unit to the outer casing of the first rechargeable battery. The second rechargeable battery is mounted by a second loading unit which is adapted for enclosing the outer casing of the second rechargeable battery within the video camera 1. The AC adapter 4 is connected, with the first battery 5 mounted thereon, to the main body of the video camera 1 having the second battery 3 enclosed therein. The first battery 5 and the second battery 3 may be charged by connecting an AC power source connector 6, connected to the AC adapter 4, to a power source, and by turning the power switch 2 off.

In this case, the second battery 3 starts to be charged only after completion of the charging of the first battery 5. The charging of the first battery 5, which is achieved quickly, is termed the prompt charging or quick charging, while the charging of the second battery 3 is termed the main body charging.

In order for the prompt charging or the main body charging to be achieved, the following conditions need to be satisfied, after the AC adapter 4 is connected to the main body of the video camera 1 and the connector 6 for the AC power source is connected to the AC power source:

First, in order for the prompt charging to occur, it is necessary for the power source switch 2 of the main body of the video camera 1 to be turned off. It is also necessary for the first battery 5 to be mounted on the AC adapter 4, while it is also necessary for the first battery 5 not to be charged fully.

On the other hand, in order for the main body charging to occur, it is necessary for the power source switch 2 of the main body of the video camera 1 to be turned off, while it is necessary for the second battery 3 to be enclosed in the main body of the video camera 1. It is also necessary for the second battery 3 not to be charged fully and for the prompt charging to have come to completion.

The prompt charging and the main body charging are carried out using an output of the AC adapter 4 as a power source. This AC adapter 4 outputs a power source voltage of e.g. 8.4 V for the prompt charging and the main body charging, while outputting a power source voltage of e.g. 6.5 V for driving the main body of the video camera 1. That is, if the power source switch 2 is turned on, the AC adapted 4 outputs the power source voltage of e.g. 6.5 V for driving the main body of the video camera 1. On the other hand, if the power source switch 2 is turned off, the AC adapter 4 outputs a power source voltage of e.g. 8.4 V for the prompt charging and the main body charging.

The power source voltage output by the AC adapter 4 for the above-mentioned prompt charging and the main body charging is 8.4 V, as mentioned above. However, a current limitation of approximately 20 mA is employed in connection with the output power source voltage for the main body during prompt charging. Consequently, the main body charging is carried out unsatisfactorily, such that, in effect, the charging is not carried out. After the end of the prompt charging, the AC adapter 4 outputs the power source voltage of 8.4 V, relieved from current limitations, in order to proceed to the main body charging. Consequently, the main body charging is carried out.

Figure 3:
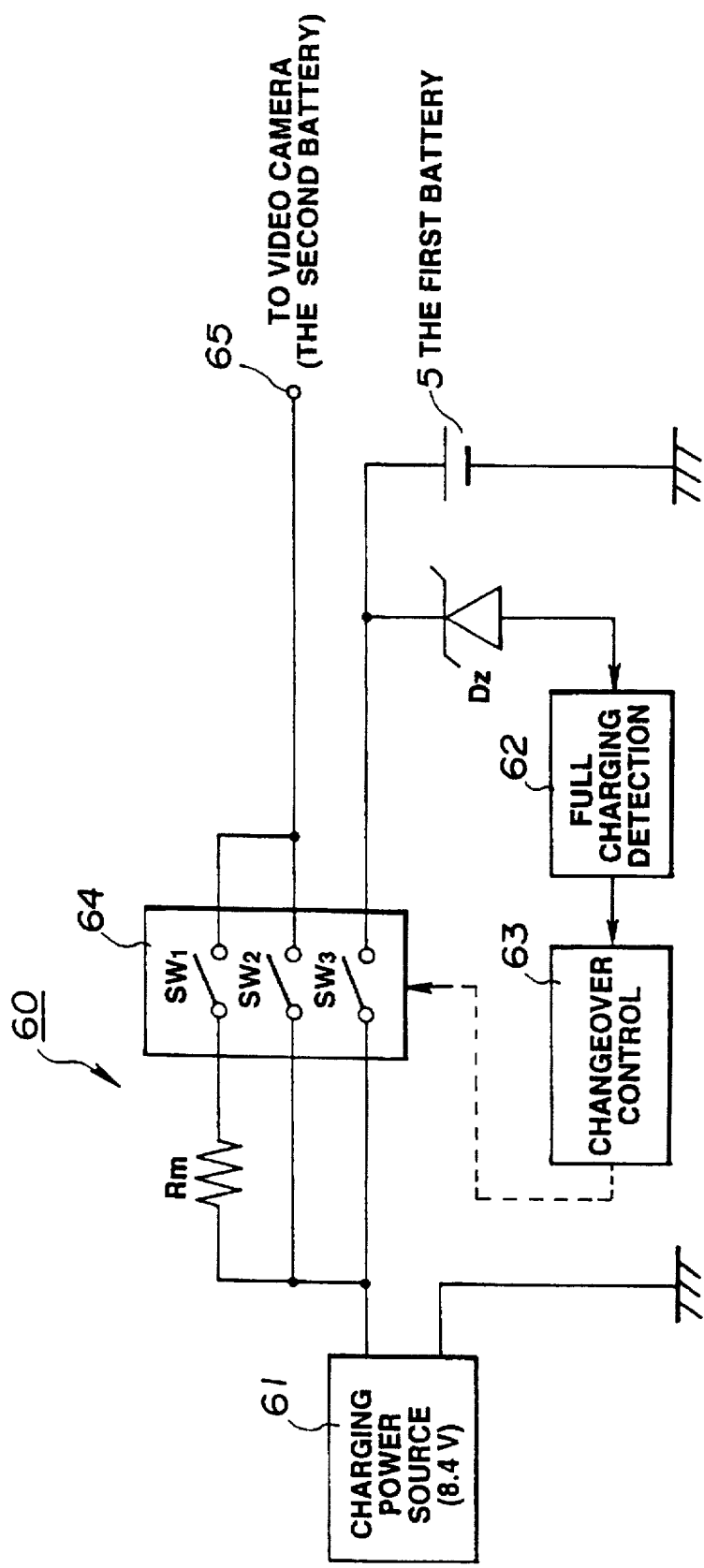
FIG. 3 is a block diagram showing an arrangement of a charging power source switching unit of an AC adapter.

FIG. 3 shows an arrangement for switching the power source voltage of the AC adapter 4 for prompt charging or main body charging, that is a charging source voltage switching unit 60.

In FIG. 3, the charging source voltage switching unit 60 is made up of a charging source unit 61 for outputting an 8.4 V charging source voltage when the power source switch 2 is turned off, a changeover switch unit 64 for switching between the state of supplying the source voltage outputted from the charging source unit 61 via output terminal 65 to the second battery 3 enclosed within the main body of the video camera 1 and the state of supplying the source voltage to the first battery 5 loaded on the AC adapter 4, a full charging detection unit 62 for detecting if the first battery 5 has reached a fully charged state, and a changeover control unit 63 for controlling the switching of the changeover switching section 64 based on the results of detection of the full charging detection unit 62.

The changeover control unit 63 may also control the switching operation performed by the changeover switch unit 64 based on the output of a prompt charging condition decision unit, not shown, adapted for deciding whether or not the present embodiment has satisfied all of the prompt charging conditions, or on the output of a main body charging condition decision unit, not shown, adapted for deciding whether or not the present embodiment has satisfied all of the main body charging conditions.

The changeover switch unit 64 includes a switch SW1 connected to a limiting resistor Pan adapted for effecting a current limitation on the output source voltage of the charging source unit 61. The switch unit 64 is adapted for effecting switching between the state of supplying the current-limited source voltage from output terminal 65 to the second battery 3 and the state of not supplying it in this manner. The switch unit 64 also includes a changeover switch SW2 for effecting the switching between the state of directly supplying the output source voltage of the charging source unit 61 to the second battery 3 via output terminal 65 and the state of not supplying it in this manner, and a changeover switch SW3 for effecting switching between the state of supplying the output source voltage of the charging source unit 61 to the first battery 5 and the state of not supplying it in this manner.

The charging power source 61 and the changeover switch SW3 constitute first charging means for charging the first battery 5.

A Zener diode Dz has its cathode connected between the changeover switch SW3 and the first battery 5 for supplying a reverse current when the first battery 5 has reached a fully charged state. The Zener diode Dz has its anode connected to the full charging detection unit 62.

The following is the operation of the charging source voltage switching unit 60 when the prompt charging conditions and the main body charging conditions have been satisfied.

The changeover control unit 63 first turns the changeover switches SW1 and SW3 of the changeover switch unit 64 on, while turning the changeover switch SW2 off. The source voltage, current-limited by the limiting resistor Rm, is supplied via output terminal 65 to the second battery 3 enclosed within the main body of the video camera 1. The source voltage from the charging power source 61 is supplied directly to the first battery 5 loaded on the AC adapter 4. Thus the prompt charging is initiated for the first battery 5. The second battery 3 undergoes insufficient main body charging during such prompt charging. The rate of such insufficient main body charging is almost as low as when the main body charging is substantially not carried out.

When the first battery 5 has reached a fully charged state, such state is sensed by the full charging detection unit via 62 Zener diode Dz, the changeover control unit 63 then causing the changeover switches SW1, SW3 of the changeover switching unit 64 to be turned off. This terminates the prompt charging and the insufficient main body charging.

After, for example, two seconds, the changeover control unit 63 turns the changeover switch SW2 of the changeover switch unit 64 on, after turning the changeover switches SW1 and SW3 off. This causes the source voltage from the charging voltage source 61 to be directly supplied via output terminal 65 to the second battery 3 enclosed within the main body of the video camera 1. On the other hand, the source voltage from the charging voltage source 61 is not supplied to the first battery 5 loaded on the AC adapter 4. Consequently, only the main body charging is carried out.

Accordingly, there are two possible current supply systems for driving the main body of the video camera 1. Either the first battery 5 or the second battery 3 may drive the main body of the video camera 1, as an internal power source. The external power source from the AC adapter 4 is a second current supply system for driving the main body of the video camera 1. The power for charging the internal power source by way of main body charging is also supplied from the AC adapter.

That is, the power source of the main body of the video camera 1 may be an internal power source for driving the main body of the camera unit 1 when the power source switch 2 is turned on and when the AC adapter 4 is not in circuit with the supply line, or an external power source for driving the main body of the camera unit 1 when the AC adapter 4 is in circuit with the supply line and the power source switch 2 is turned on. In a third state, the external power source for main body charging charges the battery stored in the main body of the video camera 1 when the AC adapter 4 is in circuit with the supply line and the power source switch 2 is turned off.

The power source system provided within the video camera, inclusive of the battery (internal power source) charged by the present embodiment, is hereinafter explained.

Figure 4:
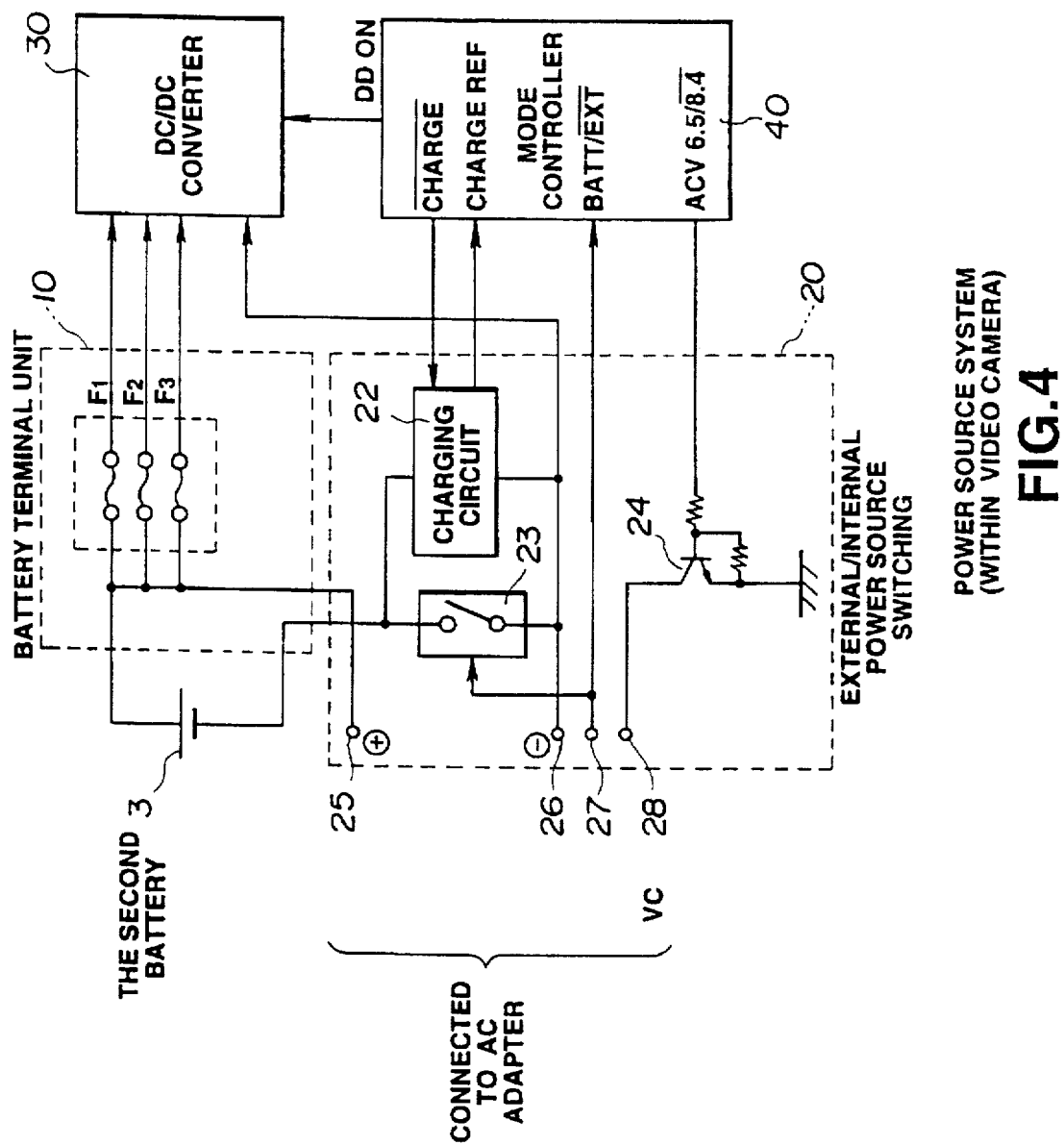
FIG. 4 is a block diagram showing the construction of a power source system of a video camera to which the present embodiment is applied.

FIG. 4 illustrates the arrangement of the power source system within the video camera 1.

That is, the power source system is made up of a battery terminal unit 10, connected to the second battery 3, an external/internal power source switching unit 20 connected via terminals 25, 26, 27 and 28 to the AC adapter 4, a DC/DC converter 30 for performing DC/DC conversion on the driving external power source or the internal power source, and a mode controller 40 for controlling the switching of the external/internal power source switching unit 20. The external/internal power source switching unit 20 has the function of effecting switching between the external power source and the internal power source and charging the second battery 3 as the internal power source using the main body charging external power source.

The battery terminal unit 10 has the second battery 3, as the internal power source, connected thereto, and supplies the internal power for motor driving, driving an image pickup unit and a video tape recorder to the DC/DC converter 30 via fuses F1, F2 and F3.

The external/internal power source switching unit 20 receives the external power source from the AC adapter 4 at input terminal 25(+) and input terminal 26(−) and changes over the power source from the driving external power source to the internal power source or vice versa to supply the selected power source to the DC/DC converter 30. The external/internal power source switching unit 20 includes a charging circuit 22 for charging the second battery 3 connected to the battery terminal unit 10 using the main body charging external power source. The AC adapted 4 is connected via terminal 28 and switching transistor 24 to the mode controller 40.

The external/internal power source switching unit 20 supplies the driving external power source from the AC adapter 4 to the DC/DC converter 30. The supply of the driving external power source from the AC adapter 4 to the DC/DC converter 30 is possible even when the second battery 3 as the internal power source is connected to the battery terminal unit 10. On the other hand, the supply of the internal power source to the DC/Dc converter 30 from the second battery 3 is possible only when there is no external power source input.

Figure 5:
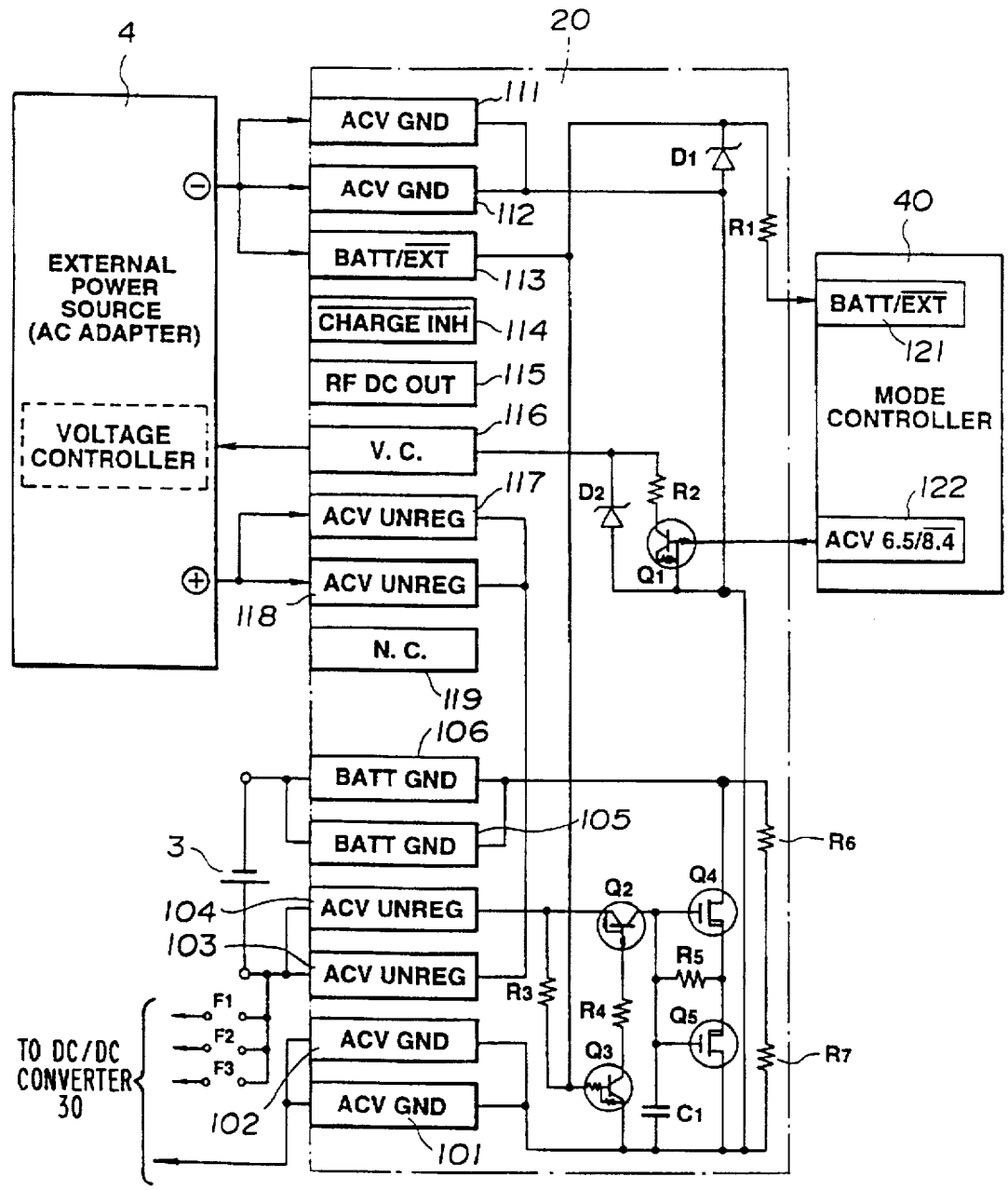
FIG. 5 is a circuit diagram showing an exemplary external/internal power source switching unit.

FIG. 5 shows an arrangement of the external/internal power source switching unit 20. The AC adapter 4, as the external power source, the mode controller 40 for controlling the switching of the external/internal power source switching unit 20 and the second battery 3 are connected to the external/internal power source switching unit 20.

On the AC adapter connection portion of the external/internal power source switching unit 20, there are connecting pins 111, 112 and 113 supplied with negative potential of the external power source from the AC adapter 4, connecting pins 117, 118 supplied with the positive potential from the external power source, a connecting pin 116 for outputting a voltage control signal VC to a voltage controller unit of the AC adapter 4, enclosed within broken line, and other connecting pins 114, 115 and 119.

On the second battery connection portion of the external/internal power source switching unit 20, there are connecting pins 105, 106 supplied with the negative potential of the second battery 3, connecting pins 103, 104 supplied with positive potential of the AC adapter 4 via pins 117 and 118 and positive potential of the second battery 3, and connecting pins 101, 102 for supplying the negative potential of the external power source from the AC adapter 4 to the DC/DC converter, not shown.

The following is the operation of the external/internal power source switching unit 20 when the external power from the AC adapter 4 is supplied.

When the positive potential of the external power source of the AC adapter 4 is connected to the connecting pins 117 and 118 and the negative potential is connected to the connecting pins 111, 112, the positive potential is connected via connecting pins 103, 104 and fuses F1, F2 and F3 to the DC/DC converter 30, not shown, while the negative potential is supplied via connecting pins 101, 102 to the DC/DC converter. Thus the external power source of the AC adapter 4 is supplied to the DC/DC converter 30 unless the connecting pins 117, 118, 111 and 112 are opened.

If the connecting pin 113 is connected to the negative potential of the external power source at the same time that the external power source is connected to the connecting pins 117, 118, transistors Q3, Q2, Q4 and Q5 are turned off, so that the negative terminal of the second battery 3 connected to the connecting pins 105, 106 is in the opened state so that it becomes impossible to supply power from the second battery 3.

The following is the operation of the external/internal power source switching unit 20 when the internal power from the second battery 3 is supplied.

If the connecting pins 117, 118, 111, 112 and 113 are opened, the base of transistor Q3 is pulled up via resistor R3 to the positive potential of the second battery 3, so that transistors Q3, Q2, Q4 and Q5 are turned on. Since the resistance across transistors Q4 and Q5 in the turned-on state is as low as approximately 40 mΩ, the power source voltage from the second battery 3 is supplied to the DC/DC converter 30 via connecting pins 103, 104, 105 and 106, fuses F1, F2 and F3 and transistors Q4 and Q5.

By having the voltage output of the AC adapter 4 of e.g. 8.4 V and e.g. 6.5 V for charging the second battery 3 as the internal power source by the charging circuit 22, that is for main body charging, and for driving the video camera, respectively, it becomes possible to improve the conversion efficiency of the DC/DC converter 30 as well as to mitigate the increase otherwise incurred in the internal temperature. The switching of the power source voltage is incurred via resistor R2 by turning the transistor Q1 on and off by switching the timing output of the connecting pin 122 of the mode controller 40 between a high (H) level and a low (L) level. That is, when the timing output of the connecting pin 122 is at the H level and at the L level, the output voltage of the AC adapter 4 is set to 6.5 and 8.4 V, respectively.

Figure 6:
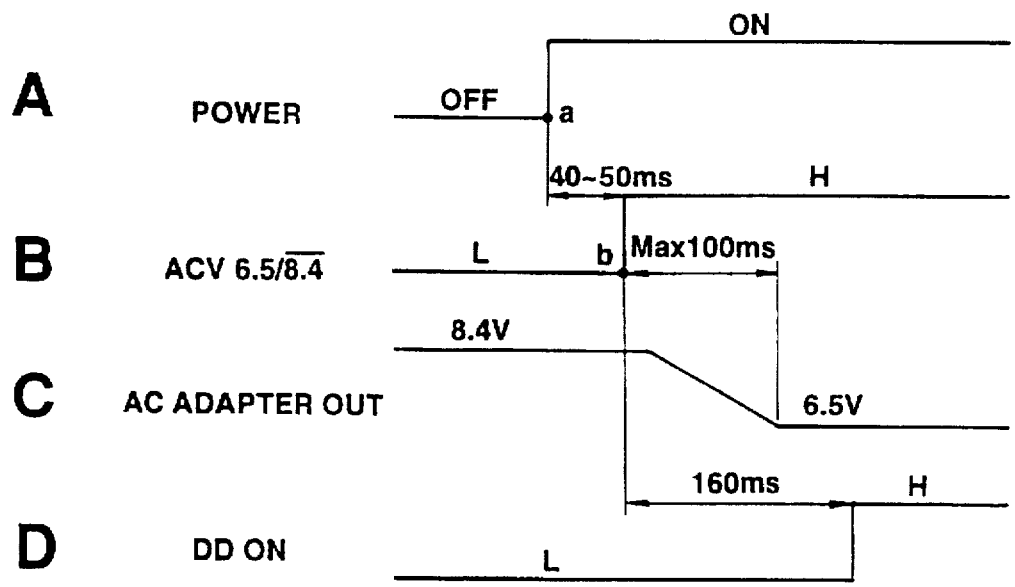
FIG. 6 is a timing chart for illustrating the switching of a power source voltage supplied by the AC adapter.
Figure 7:
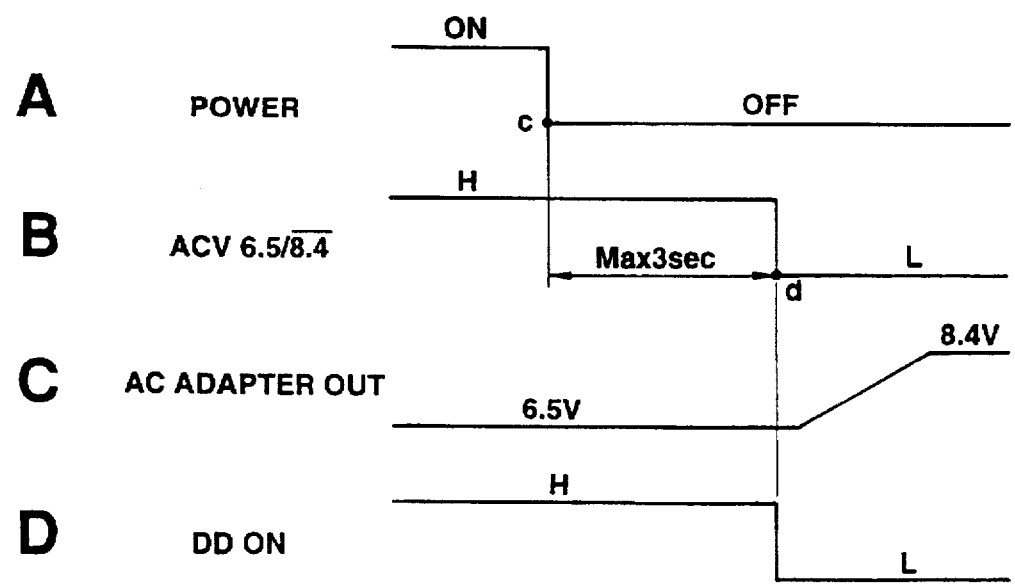
FIG. 7 is a timing chart similar to FIG. 6 for illustrating the switching of a power source voltage supplied by the AC adapter.

FIGS. 6 and 7 illustrate the timing output of the connecting pin 122 during turning on and off of the power source switch 2 of the main body of the video camera 1 and changes in the output voltage of the AC adapter 4. That is, FIGS. 6 and 7 are timing charts showing the cases in which the power source switch 2 of the main body of the video camera 1 is turned on and off, respectively. In these figures, A, B, C and D represent the on/off state of the power source switch 2 of the main body of the camera unit 1, the output of connecting pin 122 of mode controller 40, changes in the output voltage of the AC adapter 4 and the output from the mode controller 40 to the DC/DC converter 30, respectively.

That is, as shown in the timing chart shown in FIG. 6, the power source system causes the timing output of the connecting pin 122 to be changed from the L level to the H level after e.g. 40 to 50 ms from a point a at which the power source switch 2 of the main body of the video camera 1 is turned off from its turned-on state. The power source system also causes the output voltage of the external power source to be switched from 8.4 V to 6.5 V during a time interval of e.g. 100 ms at the most, from a point b at which the timing output is changed over from L level to H level. At this time, a timing output which is changed from the L level to the H level after lapse of 160 ms from the point of change b is supplied from mode controller 40 to DC/DC converter 30.

Referring to the timing chart of FIG. 7, the power source system causes the timing output of the connecting pin 122 to be changed from the H level to the L level after lapse of e.g. 3 second at the most after a point c at which the power source switch 2 of the main body of the video camera 1 is switched from on to off. The power source system also causes the output voltage of the external power source to be gradually switched from 6.5 V to 8.4 V from a point d at which the timing output is changed from H level to L level. At this time, a timing output which is changed from the H level to the L level at the point d is supplied from mode controller 40 to DC/DC converter 30.

The operation of an embodiment of the charging system for the video camera according to the present invention is hereinafter explained in connection with the main body charging for charging the second battery 3 as the internal power source of the power source system and with the prompt charging for charging the first battery 5.

With the present embodiment, neither the main body charging nor the prompt charging is carried out when the power source switch 2 of the main body of the video camera 1 is turned on, as described previously. The charging of the first battery 5 (prompt charging) is carried out by the AC adapter 4 after the power source switch 2 is turned off and, after the end of the prompt charging, the charging of the second battery 3 (main body charging) is carried out within the inside of the main body of the video camera 1.

The main body charging is carried out when all of the above-mentioned main body charging conditions are met. These conditions are newly recited as follows:

(i) the power source switch 2 of the main body of the video camera 1 is turned off;

(ii) the second battery 3 is loaded on the main body of the video camera 1 and the battery terminal voltage is not higher than 7.8 V;

(iii) the power source of the AC adapter 4 is turned on; and (iv) prompt charging has been terminated.

Of these four conditions, the conditions (i), (ii) and (iii) are judged by mode controller 40. Thus the mode controller 40 is the above-mentioned main body charging condition decision unit.

As for the condition (iv), since the charging source voltage from AC adapter 4 is subject to current limitation, the condition (IV) is met when the power source voltage is freed of the current limitation.

Figure 8:
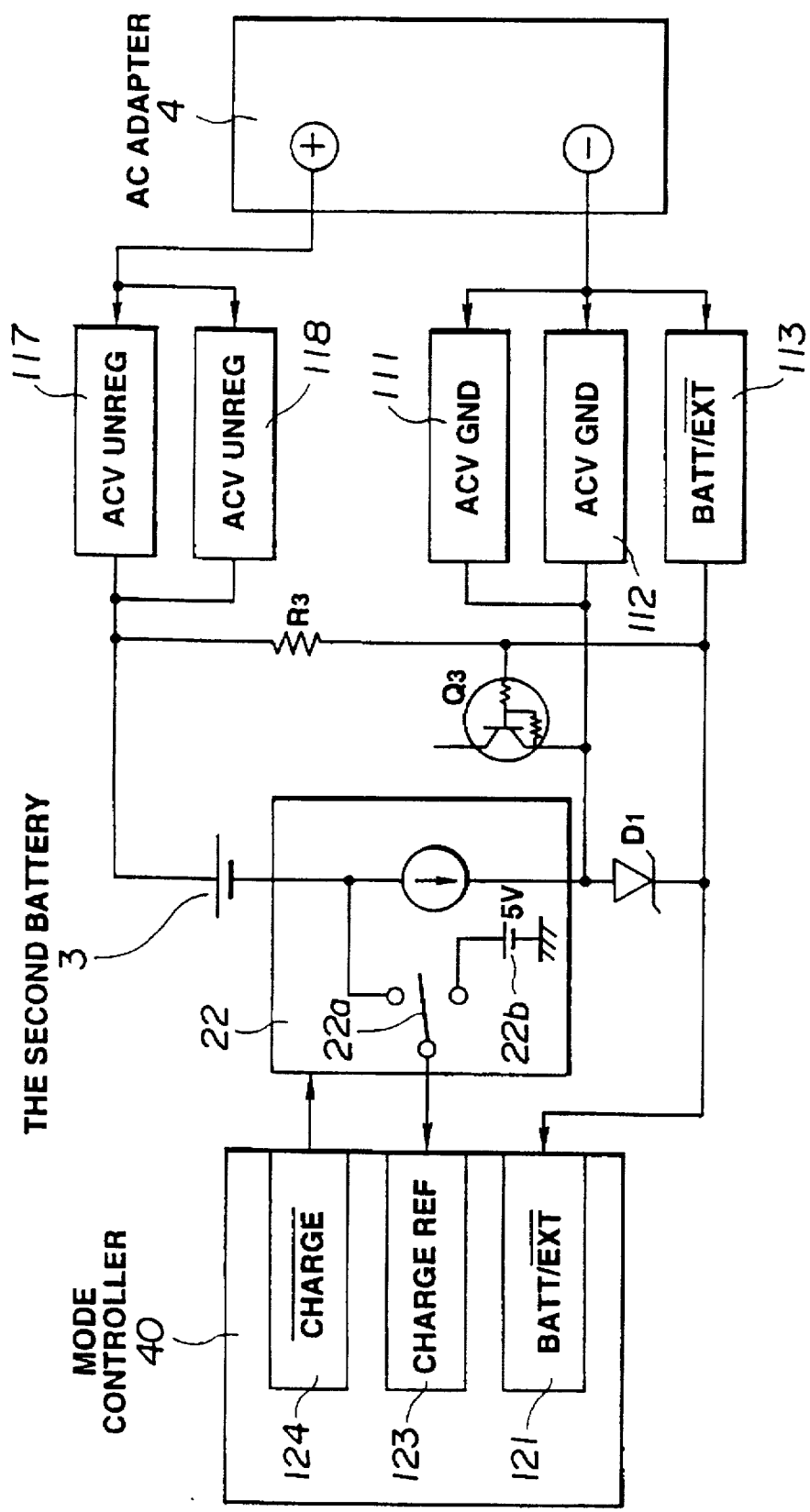
FIG. 8 is a circuit diagram showing essential components of the present embodiment for illustrating the operation of a mode controller.

The decision given by the mode controller 40 is hereinafter explained with reference to FIG. 8.

Mode controller 40 perpetually monitors the state of the power source of the main body of the video camera 1, that is whether it is on or off, in order to judge the condition (i). Mode controller 40 also monitors the terminal voltage of the second battery 3 and concludes that, if the terminal voltage is not higher than 7.8 V, the fully charged state is not reached.

Although details will be discussed later, the charging circuit 22 changes over the changeover switch 22a, when the charging conditions have been met, so that the negative potential on the order of e.g. 0 to 3.6 V of the second battery 3 is supplied to the connecting pin 123. The charging circuit 22 also changes over the changeover switch 22a to the voltage supply side 22b, if the charging conditions are not met, for supplying the voltage of e.g. 5 V to the connecting pin 123. That is, mode controller 40 monitors the output voltage from the changeover switch 22a, entered at the connecting pin 123, based on a threshold voltage of e.g. 4.5 V, for concluding whether or not charging should be started. The condition (ii) is judged in this manner.

The mode controller 40 also judges whether the condition (iii) is met, that is whether the power source of the AC adapter 4 is on or off. Since the connecting pin 113 of the external/internal power source switching unit 20 is set to the ground 1 eve 1 while the main body of the video camera 1 employs the external power source, an L-level timing input is at the connecting pin 121 of mode controller 40. If the main body of the video camera 1 is not making use of the external power source, an H level timing output is at the connecting pin 121 due to resistor R3 and diode D1. That is, the on/of state of the power source of the AC adapter 4 may be judged by monitoring the timing input at the connecting pin 121.

Figure 9:
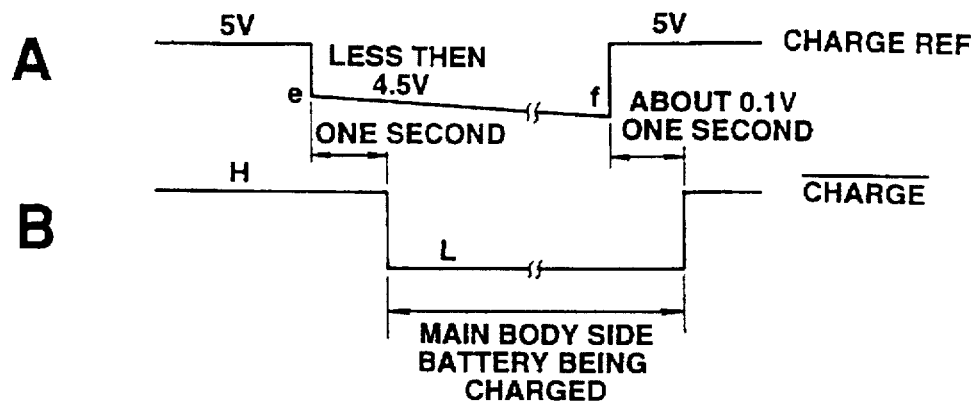
FIG. 9 is a timing chart for illustrating the operation of main body charging.

Thus the mode controller 40 monitors an output voltage of the changeover switch 22a entered to the connecting pin 123, such as the voltage of from 0 to 3.6 V or 5 V, based on the threshold voltage e.g. of 4.5 V, as shown at A in FIG. 9. When the output voltage becomes lower than e.g. 4.5 V, mode controller 40 changes over the timing output of the connecting pin 124 from the H level to the L level, as shown at B in FIG. 9, for initiating the main body charging by the charging circuit 22. The main body charging is completed, as shown at B in FIG. 9, when the output voltage shown at A in FIG. 9 reaches about 0.1 V, as shown at A in FIG. 9. Meanwhile, it is for preventing charging that the timing output of the connecting pin 124 is changed over 1 second after the points e and f of the change in input voltage to the connecting pin 123.

If, on the other hand, the input voltage to the connecting pin 123 from the changeover switch 22a exceeds 4.5 V while the power source switch 2 of the main body of the video camera 1 is turned on, the timing output of the connecting pin 124 becomes L about one second after turning off of the power source switch 2.

The above-described main body charging is initiated after the completion of the prompt charging. In the present embodiment, the charging source voltage is supplied from the AC adapter 4 for main body charging and prompt charging when the source switch 2 of the main body of the video camera 1 is turned off. During the prompt charging, the limited current of approximately 20 mA is applied during the prompt charging so that the main body charging is not actually carried out even though the main body charging mode is set.

Figure 10:
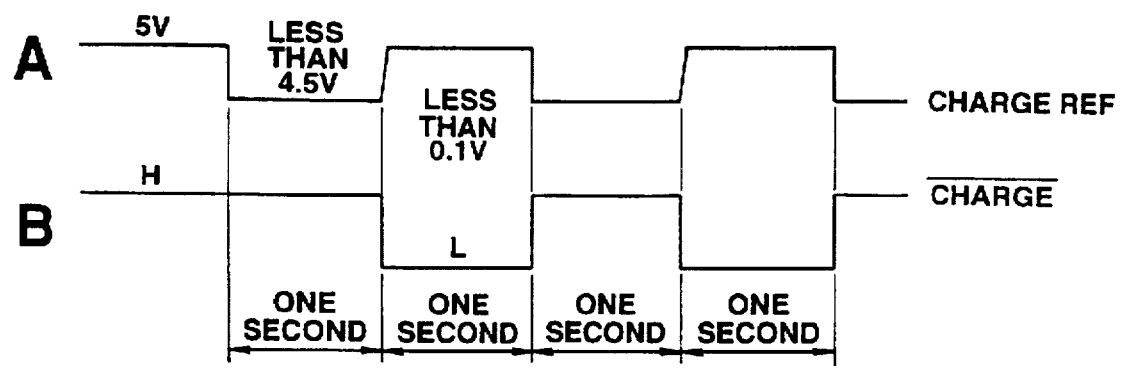
FIG. 10 is a timing chart for illustrating the operation of main body charging during quick charging.

Specifically, the main body charging is carried out by a sequence of operations shown in a timing chart of FIG. 10.

First, the voltage output from the changeover switch 22a to the connecting pin 123 of mode controller 40 is changed as shown at A in FIG. 10, because the current limiting is performed on the source voltage from the AC adapter 4. That is, as the output voltage of changeover switch 22a becomes lower than 4.5 V, and the timing output of mode controller 40 is changed from the H 1 eve 1 to the L 1 eve 1, as shown at B in FIG. 10, the second battery 3 is charged momentarily. Since the current limiting by the limiting resistor Rm is performed at this time on the charging source voltage, the potential at the positive terminal of the second battery 3 is lowered. The potential of the negative terminal of the second battery 3 then is lower than 0.1 V, so that the input voltage to the connecting pin 123 from the changeover switch 22a is switched to 5 V. The timing output of the connecting pin 124 of mode controller 40 then becomes L at intervals of 2 seconds, as shown at B in FIG. 10. With the L level of the timing output, the charging circuit 22 charges the second battery 3 only momentarily. Thus the second battery 3 is scarcely charged during the prompt charging.

That is, during the time the first battery 5 is charged promptly by the AC adapter 4, the current limiting is performed on the output supplied from the AC adapter 4 to the charging circuit 22 of the main body 1, so that substantially the main body charging is not performed and only the prompt charging is performed.

The prompt charging comes to completion when the changeover control unit 63 changes over the changeover switching unit 64 based on the results of detection by the full charging detection unit 62 of the full-charging of the first battery 5. Since the output of the AC adapter 4 is turned off for about two seconds after the end of the prompt charging, the main body of the video camera 1 proceeds to the main body charging operation once the power source is turned on.

The operation which occurs after the end of the prompt charging and the subsequent start of the main body charging until the end of the main body charging is hereinafter explained with reference to a specific embodiment of the main body charging circuit.

Figure 11:
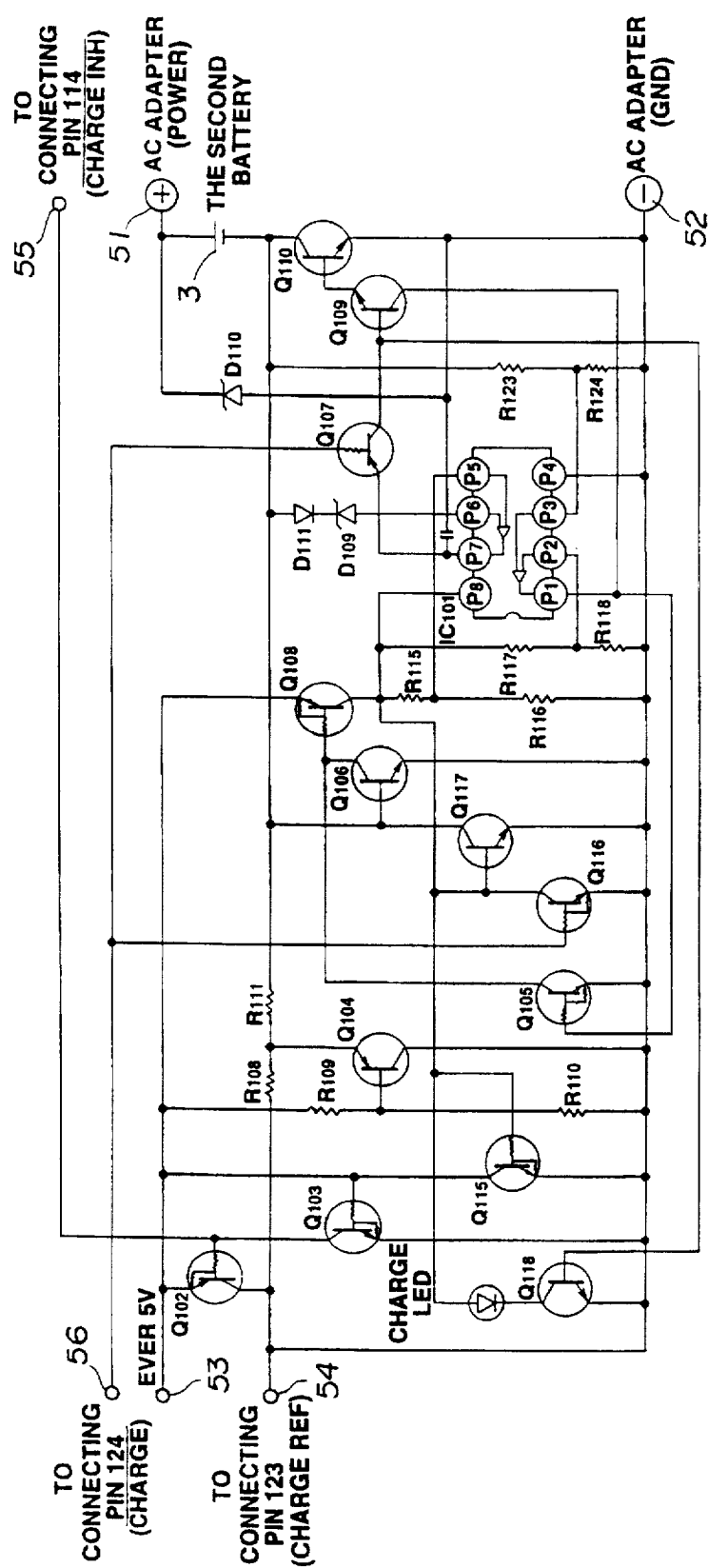
FIG. 11 is a circuit diagram of an exemplary circuit for main body charging.

FIG. 11 shows, in circuit diagram, a concrete embodiment of the main body charging circuit.

If the charging source voltage, herein 8.4 V, is supplied from the AC adapter 4 via input terminal (+) 51 and input terminal (−) 52 to the main body charging circuit 22, 5 V is simultaneously supplied via input terminal 53.

If, on loading the second battery 3, the base potential of transistor Q106 becomes about 0.6 V or higher, transistors Q106 and Q108 are turned on to supply the power to IC 101. At this time, transistor Q115 is turned on, while transistors Q103 and Q102 are turned off, so that the negative potential of the second battery 3 is transmitted via resistors R111 and R108 and output terminal 54 to connecting pin 123 of mode controller 40.

However, if the connector 114 of the external/internal power source switching unit 20 connected to terminal 55 is grounded, transistor Q102 is forced to be turned on, so that the potential transmitted from output terminal 54 to connecting pin 123 is approximately 5 V.

The resistors R109, R110 and transistor Q104 make up a voltage limiter for preventing the voltage transmitted from output terminal 54 to connecting pin 123 from being increased to 3.6 V or higher when transistor Q102 is turned off. By this voltage limiter, it becomes possible to prevent malfunction of the mode controller 40.

When the above-mentioned sequence of operations of discriminating the conditions of starting of the main body charging, that is when the charging starting conditions are met, an L-level timing output is supplied in about one second from the connecting terminal 124 of mode controller 40 to input terminal 56. This causes the transistor Q107 and subsequently the transistors Q109, Q110 to be turned on, so that the charging current is allowed to flow from AC adapter 4 to the second battery 3 via input terminals 51, 52 to start the main body charging.

A reference voltage, herein about 0.2 V, is supplied to pin P5 of IC 101 by voltage division by resistors Rl 15 and Rl 16. Thus the potential at pin 106 of IC 101 is feedback-controlled to be approximately 0.2 V by an operational amplifier included in the IC 101. Thus the current flowing through transistor Ql 10 is approximately 0.3 A.

When the charging is started as described above with the present main body charging circuit, the base potential of the transistor Q109 is approximately 1.5 V, so that transistor Q118 is turned on to illuminate a charging LED to apprise the user of the fact that the charging system is in the course of charging. The charging LED is illuminated in this manner to avoid the situation that, since the LED would be scintillated at a period of one second if the LED is directly driven by a timing output supplied from the connecting pin 124 to the input terminal 56 because of the repeated on/off operation of the main body charging circuit 22 during the prompt charging by the AC adapter 4.

The following is the operation of terminating the main body charging.

A reference voltage, herein about 0.1 V, is supplied to the pin P2 of the IC101 by voltage division by resistors R111 and R118. When the potential of the negative terminal of the second battery 3 falls below about 1.2 V, the potential of the IC 101 becomes lower than 0.1 V, by voltage division by resistors R123 and R124, with the output of pin P1 of IC 101 being at L level. Since transistors Q109, Q110 are turned off at this time, main body charging comes to a close. Besides, since transistors Q105, Q108 are turned off, transistor Q115 is turned off, while transistors Q103 and Q102 are turned on, so that the potential from output terminal 54 to connecting pin 123 becomes approximately 5 V. If the output potential to connecting pin 123 is at the H level, that is higher than 4.5 V, the output of connecting pin 124 of mode controller 40 is at the H level in about one second.

For preventing charging from being re-started directly after the end of main body charging, transistors Q116, Q117 are connected to the base of transistor Q106 to prevent transistor Q106 from being turned on when the timing output of connecting pin 124 is at the L level. Consequently, charging cannot be restarted for one second after the end of charging for preventing the malfunction when the AC adapter 4 is performing prompt charging.

The main body charging circuit 22 provided protective functions from both the hardware and software aspects for assuring the safety in the case of e.g. abnormal battery loading.

Referring to the hardware aspect, a diode D110 is provided for preventing the charging when the output voltage of the AC adapter 4 becomes unusual so that the output voltage exceeds 9.1 V. Besides, diodes D109, D111 are provided for preventing the charging for the voltage across battery terminals lower than 2.7 V in case of shorting of the battery terminals.

Referring to the software aspect, if the battery terminal voltage is lower than 6 V within 30 minutes after the start of charging, a decision is given to the effect that the battery is in trouble and charging is automatically terminated. Similarly, if the charging is not completed in eight hours from the start of charging, the battery is judged to be in trouble and the charging is automatically terminated. In both of these cases, charging is restarted on battery exchange or by again turning on the power source.

With the present embodiment, after the power switch 2 of the main body of the video camera 1 is turned off, current limiting is performed on the output power source voltage outputted from the AC adapter 4 for main body charging for effectively preventing the main body charging by way of placing priority on prompt charging.

It is to be noted that the present invention is not limited to the above-described embodiment. For example, the main body charging circuit may be constructed differently from the above-described embodiment.

What is claimed is:

1. A power system for electronic equipment comprising:
   a power source adapter; and
   electronic equipment having a rechargeable battery detachably mounted thereon;
   said power source adapter comprising:
   first battery securing means for securing a first rechargeable battery;
   charging voltage generating means for generating a charging voltage for charging said first rechargeable battery and a second rechargeable battery secured on said electronic equipment;
   first charging means for charging said first rechargeable battery secured on said first battery securing means using said charging voltage;
   switching means for switching between supplying said charging voltage to said first charging means and supplying said charging voltage to said electronic equipment;
   detection means for detecting completion of charging of said first rechargeable battery; and
   switching control means for controlling the switching of said switching means responsive to an output of said detection means;
   said electronic equipment comprising:
   second securing means for securing said second rechargeable battery as an internal supply for powering said electronic equipment; and
   second charging means for receiving the charging voltage from said power source adapter for charging said second rechargeable battery;
   wherein, when the charging voltage from said charging voltage generating means is supplied to said first rechargeable battery by the operation of said switching means, said electronic equipment is supplied with a voltage on which current limiting is performed; and
   wherein said current limiting prevents charging of the battery in the electronic equipment.

2. The system as claimed in claim 1, wherein said electronic equipment further comprises supply switching means for switching between the second rechargeable battery as an internal power source and said power source adapter as an external power source.

3. The system as claimed in claim 2, wherein said supply switching means draws power from said external power source when said external power source is available.

4. The system as claimed in claim 1, wherein said power source adapter further comprises a voltage controller for controlling said power source adapter to provide a power source voltage for powering said electronic equipment or a charging voltage for charging a battery, and further wherein said electronic equipment further comprises signal generating means for generating a switching signal for signaling said voltage controller to provide said power source voltage or said charging voltage from said power source adapter.

5. The system as claimed in claim 1, wherein charging of said second rechargeable battery is started after charging of said first rechargeable battery.

6. An electronic equipment having a rechargeable battery detachably mounted therein, wherein said battery may provide power to said equipment as an internal power source, comprising:
   securing means for securing said rechargeable battery;
   switching means for switching between said rechargeable battery as an internal power source for said equipment and an external power source supplying a power source voltage;

charging means for charging said rechargeable battery by a charging voltage which is alternately supplied from said external power source; and switching signal generating means for generating a switching signal for signalling said external power source to provide said power source voltage or said charging voltage.

7. The electronic equipment as claimed in claim 6, wherein said switching means provides power for said equipment from said external power source when said external power source is available.

8. A power source adapter for supplying power to electronic equipment, wherein said equipment has a rechargeable battery detachably mounted thereon, comprising;

battery securing means for securing a second rechargeable battery, voltage generating means for generating a charging voltage, charging means for charging said second rechargeable battery secured on said battery securing means, using said charging voltage, switching means for either supplying said charging voltage to said charging means and supplying a current-limited voltage to said electronic equipment or supplying said charging voltage without to said electronic equipment, detection means for detecting completion of charging of said second rechargeable battery, and switching control means for controlling the switching of said switching means responsive to an output of said detection means.

9. The power source adapter as claimed in claim 8, wherein switching by said switching means is effected by a switching signal supplied from said electronic equipment.

* * * * *